(No Model.)
N. K. WRIGHT.
ICE TONGS.
No. 361,108.  Patented Apr. 12, 1887.
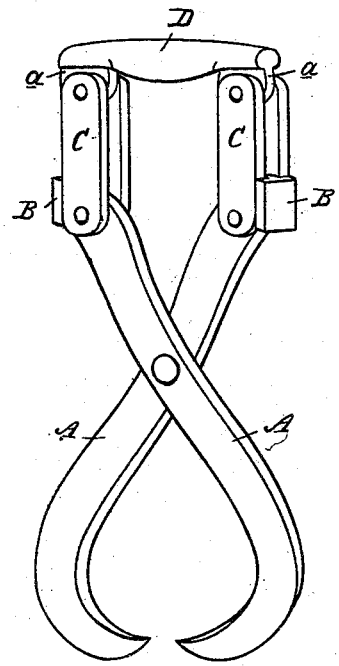
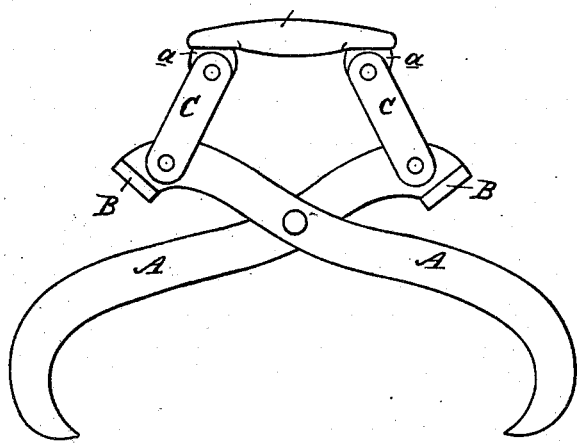
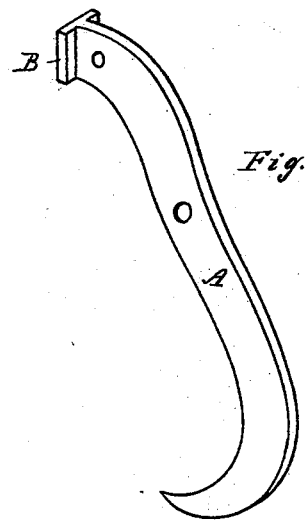
Attest:
John Schuman.
Inventor:
Newton K. Wright.
by his Att'y
Thos. S. Sprague

UNITED STATES PATENT OFFICE.

NEWTON K. WRIGHT, OF PEWAMO, MICHIGAN.

ICE-TONGS.

SPECIFICATION forming part of Letters Patent No. 361,108, dated April 12, 1887.

Application filed February 17, 1887. Serial No. 227,877. (No model.)

*To all whom it may concern:*

Be it known that I, NEWTON K. WRIGHT, of Pewamo, in the county of Ionia and State of Michigan, have invented new and useful Improvements in Ice-Tongs; and I do hereby declare that the following is a full, clear, and exact description thereof, reference being had to the accompanying drawings, which form a part of this specification.

This invention relates to certain new and useful improvements in ice-tongs.

The invention consists in the peculiar construction, arrangement, and combination of parts, whereby the legs of the tongs can readily be spread apart to grasp the ice, all as more fully hereinafter set forth.

Figure 1 is a perspective view of my improved tongs. Fig. 2 is a side elevation with the tongs opened. Fig. 3 is a detail perspective of one of the legs of the tongs and its connections.

In the accompanying drawings, which form a part of this specification, A A represent the two legs of a pair of ice-tongs, pivotally secured together, as in the usual manner. The upper ends of these legs A are provided with flanged heads B, and in the rear of these heads the lower ends of the links C are pivotally secured to the legs A, the upper ends of such links being likewise pivotally secured to the ears *a* of a handle, D.

In practice the normal positions of the parts are as shown in Fig. 1. If it is desired to lift a piece of ice, the operator grasps the handle and rests the points of the legs upon the ice. By the pressing down upon the handle the points are forced apart until they embrace the ice, when, by pulling up on the handle, the points are embedded in the ice, and the latter is then easily carried. By again pushing down upon the handle the points are released. The flanged heads coming in contact with the lower edges of the links C prevent the tongs from closing past a certain point, and the liability of pinching the hand is avoided.

While I have shown and described two links as pivoted to each leg of the tongs, it is evident that one link could be employed at each end of the handle without departing from the spirit of my invention.

What I claim as my invention is—

1. In combination with the legs of a pair of ice-tongs, the links C, connecting the handle D with the legs A, said legs being provided with the flanged heads B, substantially as described.

2. The combination of the legs A A, provided with the flanged heads B, with the links C and handle D, provided with the ears *a*, when constructed, arranged, and operating substantially in the manner and for the purposes set forth.

NEWTON K. WRIGHT.

Witnesses:
JNO. W. SWINDT,
BRUCE N. KEISTER.